3,056,827
PREPARATION OF ESTERS BY REACTING AN ANHYDRIDE WITH CARBONIC ACID DIESTERS

Thomas Bela Windholz, Westfield, N.J., assignor to Celanese Corporation of America, New York, N.Y., a corporation of Delaware
No Drawing. Filed Aug. 19, 1959, Ser. No. 834,653
11 Claims. (Cl. 260—476)

The present invention relates to a novel method for preparing esters. More particularly, it relates to a process involving the reaction between anhydrides of carboxylic acids and diesters of carbonic acid.

According to one aspect of the invention, a symmetrical anhydride characterized by the structure:

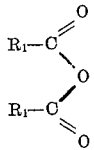

in which $R_1$ is a monofunctional organic radical, such as an alkyl or aryl radical, can be readily reacted at elevated temperatures with a neutral diester of carbonic acid having the formula:

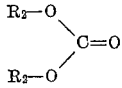

wherein $R_2$ is a monofunctional organic radical, such as an alkyl or aryl radical. An ester of the below defined structure is obtained:

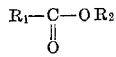

wherein $R_1$ and $R_2$ are as above defined.

In another aspect of the invention the diester of carbonic acid may have the formula:

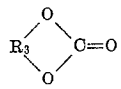

wherein $R_3$ is a difunctional organic radical, such as an alkylene radical. In this case, the following structure is obtained:

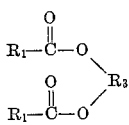

in which $R_1$ and $R_3$ are defined as above.

In still another aspect of the invention, an asymmetrical carboxylic anhydride may be used to produce a product containing a mixture of esters. Thus, if an acetic-propionic anhydride were used, the product would contain both acetates and propionates.

In still another aspect of the invention, anhydrides of polycarboxylic acids may be used to produce esters thereof. For example, if cyclic anhydrides of dicarboxylic acids are reacted with carbonic diesters having difunctional bridging radicals, as described above, polymeric polyesters are produced which may be used as fiber forming resins or as coating resins.

For the successful practice of the present invention, the utilization of decomposition temperatures sufficient to cause the formation of carbon dioxide during the course of the reaction is an essential condition. Since carbon dioxide evolution, in the absence of a catalyst commences herein at about 150° C. at atmospheric pressure, temperatures in excess of about 150° C., and preferably from about 200° C. to 350° C. are preferably employed to effect the reaction of the invention. Where one of the reactants has a boiling point lower than that of the desired minimal reaction temperature, its volatilization may be avoided by an increase in pressure. Usually, pressures of from 50 p.s.i. to about 500 p.s.i. can be utilized when low boiling reactants are used. Thus, the formation of carbon dioxide gas and resultant desired ester are assured.

Illustrative anhydrides of carboxylic acids include symmetrical anhydrides, such as benzoic anhydride, toluic anhydride, acetic anhydride, 2-phenyl acetic anhydride, p-nitro-2-phenyl acetic anhydride, butyric anhydride, 2,2-dimethyl propionic anhydride, p-nitrobenzoic anhydride and 1-naphthoic anhydride; asymmetrical anhydrides, such as acetic-propionic anhydride, acetic-benzoic anhydride, benzoic-p-nitrobenzoic anhydride; and cyclic anhydrides such as phthalic anhydride, maleic anhydride, succinic anhydride cis cyclohexane 1,2 carboxylic anhydride and trans cyclohexane 1,2 carboxylic anhydride.

Some illustrative neutral diester carbonates contemplated in the practice herein are diethyl carbonate, dipropyl carbonate, diisopropyl carbonate, dibutyl carbonate, diphenyl carbonate, ethylene carbonate, 1,2-proplyene carbonate, dicresyl carbonate and 1,3-propylene carbonate.

The two reactants may advantageously be admixed in equimolar proportion. However, either reactant may be present in excess and still permit good yields of ester (based on the minor reactant) to be obtained.

In order to facilitate a further understanding of the invention, the following examples are given primarily for the purpose of illustrating certain more specific details therof. The scope of the invention is not to be deemed limited thereby except as defined in the claims. Unless otherwise stated, the parts are by weight.

Example I

A mixture of 2.26 parts (0.01 mole) of benzoic anhydride and 0.88 part of ethylene carbonate (0.01 mole) was gradually heated for a period of one hour in a reaction vessel equipped with reflux condenser. Perceptibly strong carbon dioxide evolution started at about 220° C. and terminated at a temperature of about 275° C. The product was cooled to about 25° C. and purified by recrystallisation from methanol. A yield of 80% glycol dibenzoate having a melting point of 73° C.–74° C. was obtained. The melting point was undepressed when the product was mixed with an authentic sample.

Example II

In a vessel equipped with reflux condenser a mixture of 2.26 parts of benzoic anhydride (0.01 mole) and 2.14 parts of diphenyl carbonate (0.01 mole) is heated gradually. The evolution of carbon dioxide commenced at a temperature of about 160° C. and terminated after about 20 minutes at a temperature between 240° C. and 250° C. The reaction mass was next cooled to room temperature and solidified. Aqueous sodium hydroxide was added to the reaction product, the product filtered and washed with water and dried. A 90.5% yield of phenyl benzoate having a melting point of 67–69° C. was obtained. One recrystallization from ethanol raised the melting point to 70–71° C.

It is to be understood that the foregoing detailed description is merely given by way of illustration and that many variations may be made therein without departing from the spirit of my invention.

Having described my invention, what I desire to secure by Letters Patent is:

1. A process for preparing an ester which comprises admixing an anhydride of at least one carboxylic acid with a diester of carbonic acid and an organic hydroxyl compound and reacting said admixture at an elevated temperature sufficient to cause the evolution of carbon dioxide to produce an ester of said carboxylic acid and said hydroxyl compound and carbon dioxide.

2. The process of claim 1 wherein said anhydride is a symmetrical anhydride.

3. The process of claim 1 wherein said anhydride is a cyclic anhydride.

4. A process according to claim 2 wherein equimolar proportions of said symmetrical anhydride and said carbonic acid diester are reacted.

5. A process according to claim 4 in which the symmetrical anhydride is benzoic anhydride.

6. A process according to claim 1 in which the carbonic acid diester is the diester of a diol.

7. A process according to claim 6 in which the carbonic acid diester is ethylene carbonate.

8. A process according to claim 1 in which the carbonic acid diester is diphenyl carbonate.

9. A process according to claim 1 in which the temperature of reaction is between 150° C. and 350° C. and in which the pressure is from about atmospheric pressure to about 500 p.s.i.

10. A process for reacting an admixture of equimolar quantities of ethylene carbonate and benzoic anhydride which comprises heating the said reactants at a temperature of from 220° C. to about 275° C. and thereafter recovering glycol dibenzoate from the reaction mixture.

11. A process for reacting an admixture of equimolar quantities of diphenyl carbonate and benzoic anhydride which comprises heating the said reactants at a temperature of from 150° C. to about 250° C., and thereafter recovering phenyl benzoate from the reaction mixture.

References Cited in the file of this patent

UNITED STATES PATENTS 2,448,767   Carlson _____ Sept. 7, 1948

FOREIGN PATENTS 804,564   Germany _____ Apr. 26, 1951
730,599   Great Britain _____ May 25, 1955

OTHER REFERENCES

Einhorn: Ber., 42, 2772–3 (1909).
Windholz: J. Org. Chem., vol. 23, page 2044 (1958).